United States Patent Office 2,813,349
Patented Nov. 19, 1957

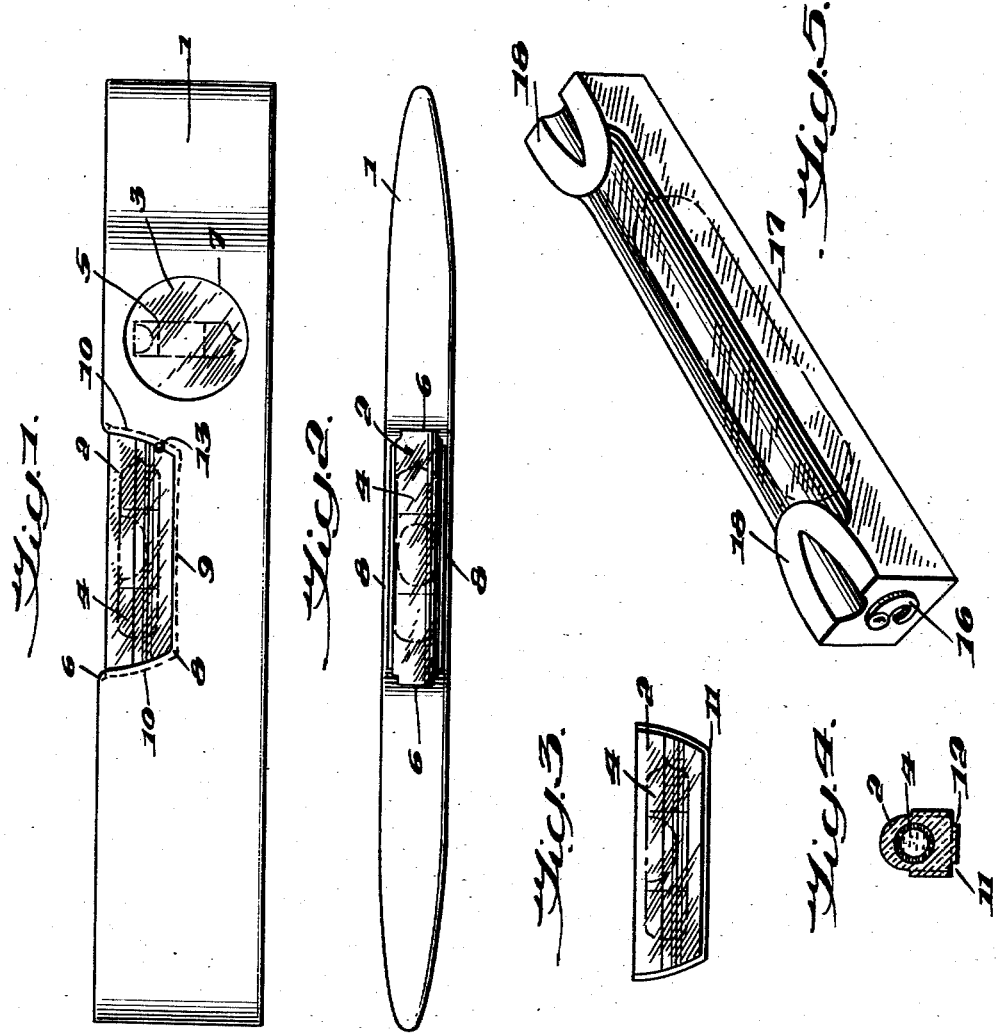

2,813,349
LEVEL

Todd Harris, Stony Brook, N. Y., assignor to Creative Plastics Corporation, Stony Brook, N. Y., a corporation of New York Application January 2, 1953, Serial No. 329,183

8 Claims. (Cl. 33—211)

The present invention relates to improvements in levels and more particularly to improvements in spirit vial or bubble levels.

It is an object of the invention to provide a level which is substantially non-breakable.

It is a further object of the invention to provide a level which is easy to read.

It is still another object of the invention to provide a bubble level in which the bubble has improved dimensional stability when subjected to rapid changes in temperature in the ambient medium in which it is used.

In the past, one of the primary difficulties with spirit vial or bubble levels has been their susceptibility to breakage in view of the fact that the thin wall glass spirit vial shatters very easily. To reduce such breakage, rather elaborate protective coverings are usually provided, but these have the disadvantage that they tend to obscure the view of the bubble unless viewed from a certain angle. Attempts have been made to make the glass vials for the levels of thicker glass, but because of the difficulty in manufacture of such thicker walled glass vials, they have not come into general use. Attempts have also been made to produce plastic vials for receiving the spirit liquid and bubble to provide a structure which is substantially shatter proof, but it has been found that such plastic vials did not have sufficient dimensional stability to provide the accuracy desired.

The level according to the invention in its broader aspects comprises an ordinary glass spirit vial completely embedded in a massive monolithic suitably shaped rigid body of transparent plastic. The term monolithic as employed herein is intended to mean a seamless structure such as is obtained by molding or casting the plastic with the vial in place. Preferably the plastic is molded with the vial in place for, although casting procedures can be employed using liquid materials which set up, such casting procedures have been found difficult to control. The plastic employed according to the invention is preferably a thermoplastic material of the acrylate or methacrylate type such as "Plexiglas" or "Lucite" and it is molded around the spirit vial by packing the plastic molding powder and the vial in a suitably shaped mold, heating the plastic to molding temperatures, compression molding the plastic with the vial in place and cooling the plastic to cause it to set. It has been found preferable to release the pressure upon the molded plastic as soon as it has achieved sufficient rigidity to retain its shape and monolithic structure and then to cool the molded plastic containing the vial as slowly as practical to lessen the danger of engendering internal stresses which may cause cracking of the glass vial. While considerable difficulty was originally encountered with breakage of the glass vials during the molding of the plastic, it was found that this difficulty could be overcome by the selection of a suitable liquid to provide the bubble having a sufficiently low co-efficient of expansion and a sufficiently high boiling point or boiling point range so as to prevent expansion of the liquid during heating to molding pressures from cracking the glass vial. A liquid which has been found eminently suited when acrylate or methacrylate resins which can be molded at 280° to 370° F. are employed as the plastic for encasement of the glass spirit vial is "Shell Mineral Spirits #8181" which has a coefficient of expansion of $50 \times 10^{-5}$ and a boiling point range between about 313° and 383° F.

While it is practical to have the whole leveling device substantially consist of the glass vial embedded in the monolithic transparent plastic in the production of smaller sized levels such as line levels, it is preferable in larger levels to provide a separate body to carry the plastic encased glass spirit vials.

The accompanying drawings show by way of example several modifications of the improved level according to the invention.

In the drawings:

Fig. 1 is a side view of a level according to a preferred embodiment of the invention, Fig. 2 is a top view of the embodiment shown in Fig. 1, Fig. 3 is a side view of one of the plastic encased spirit vial elements employed in the level of Figs. 1 and 2, Fig. 4 is a cross-sectional view of the vial element shown in Fig. 3, and Fig. 5 is a perspective view of a line level according to the invention.

Referring to the drawings, the level shown in Figs. 1 and 2 is composed of a body 1 which is preferably of a non-warping plastic such as cellulose butyrate-acetate or a high impact strength styrene resin such as an acrylonitrilestyrene polymer, and the transparent plastic elements 2 and 3 which encase spirit vials 4 and 5 respectively. The body 1 is provided with two recesses 6 and 7 for receiving and holding the transparent plastic elements 2 and 3 respectively. Recess 6 is at the top of body 1 and serves to hold the plastic encased spirit vial which is used to determine correctness of position in relation to a true horizontal. Flanges 8 are provided at the outer edges of recess 6 extending above the floor 9 thereof. Preferably floor 9 is bulged slightly upwardly in the center to permit plastic element 2 to be rocked after insertion in order to permit alignment of vial 4 which is encased therein with the body 1 of the level as will be explained more fully hereinafter. The side walls 10 and the portion of the flanges associated therewith of recess 6 preferably are shaped as the arcs of a circle to permit the complementary end portions of plastic element 2 to be displaced during the aligning without opening any gaps. Recess 7 which serves to receive the plastic encased spirit vial for determining correctness of position vertically is of circular cross-section to receive the circular plastic element 3.

As shown in Figs. 3 and 4, plastic element 2 is provided with cutouts 11 and 12 which are complementary to flanges 8 of recess 6. In assembling the level according to the invention, body 1 of the level is placed upon a horizontal surface and a small amount of suitable adhesive is applied to recess 6 and if desired, to the matching surfaces of plastic element 2. The plastic element is then fitted into recess 6 so that its flat bottom surface rests upon the bulge in the floor 9 and the plastic element is rocked until the bubble of the spirit vial encased therein indicates a true horizontal position. After the adhesive has set, pin 13 is driven in to assure that the plastic element 2 is permanently held in proper position. Preferably such a pin is inserted on each side of the level on diametrically opposite corners of the plastic element. It will be noted that the flanges 8 at the edges of recess 6 extend over plastic element 2 and prevent lateral displacement of the plastic element and furthermore cover the gap or gaps caused by alignment of the plastic element to give a true horizontal reading. If desired, a luminescent coating or insert can be provided on the floor 9 of recess 6 below the spirit vial to facilitate reading of the level in poorly illuminated situations.

Recess 7 and plastic element 3 preferably have complementary slightly tapered walls so that the plastic element can be firmly seated in such recess. As both the recess and the plastic element are circular, it is a simple matter to rotate the plastic element into proper alignment and to cement it in place.

Fig. 5 shows a line level according to the invention in which the plastic which encases the glass spirit vial 14 forms the body 15 of such level. A swiveled hook 16 is provided on each end of the level to permit attachment to a line. As the plastic which encases the spirit vial also forms the body of the level, proper alignment of the level is effected by clamping the level in a position so that the bubble indicates true horizontal position and then sanding and polishing off the bottom 17 and end portions 18 of the top to provide parallel horizontal surfaces on the bottom and top portions of the level.

Aside from the substantially shatterproof character of the levels according to the invention, it will be apparent that they are considerably easier to read as the entire spirit vial is visible and more easily illuminated than the levels of conventional design in which protective shields are provided which cover substantial portions of the vial. Furthermore, as the transparent plastic bodies encasing the spirit vials can be shaped as desired, they can be given convex surfaces such as the dome shaped elements shown which serve to magnify the spirit vials and the bubbles contained therein.

I claim:

1. A level including a glass spirit vial completely embedded in a monolithic body of rigid transparent plastic completely conforming to and firmly holding all of the exterior surfaces of the glass vial.

2. A level including a glass spirit vial completely embedded in a molded monolithic body of rigid transparent plastic completely conforming to and firmly holding all of the exterior surfaces of the glass vial.

3. A level including a glass spirit vial completely embedded in a monolithic body of rigid transparent plastic completely conforming to and firmly holding all of the exterior surfaces of the glass vial, said body of transparent plastic being convexly shaped adjacent to at least a portion of the vial to provide magnification of the vial when viewed through said convexly shaped portion.

4. A level comprising an elongated body having a recess at the top and a rigid monolithic transparent rigid plastic element completely encasing a glass spirit vial affixed to said body in said recess, said glass spirit vial being embedded in said plastic element, the plastic of said element completely conforming to and firmly holding all of the exterior surfaces of the glass vial.

5. A level comprising an elongated body having a recess at the top and extending down the sides thereof, said recess having lateral walls and a floor and spaced flanges extending into a portion of the recess from the edges of the lateral wall and floor portions and a rigid monolithic transparent plastic element completely encasing a glass spirit vial affixed to said body in said recess, said glass spirit vial being embedded in said plastic element, the plastic of said element completely conforming to and firmly holding all of the exterior surfaces of the glass vial, said plastic element extending into the space between said flanges.

6. A level comprising an elongated body having a recess at the top and extending down the sides thereof, said recess having lateral walls and a floor and spaced flanges extending into a portion of the recess from the edges of the lateral wall and floor portions and a rigid monolithic transparent plastic element completely encasing a glass spirit vial affixed to said body in said recess, said glass spirit vial being embedded in said plastic element, the plastic of said element completely conforming to and firmly holding all of the exterior surfaces of the glass vial, said plastic element having cut out portions complementary to said flanges to permit a portion thereof to extend into the space between said flanges.

7. A level comprising an elongated body having a recess at the top and extending down the sides thereof, said recess having lateral walls and a floor and spaced flanges extending into a portion of the recess from the edges of the lateral wall and floor portions, a rigid monolithic transparent plastic element completely encasing a glass spirit vial cemented to said body in said recess, said glass spirit vial being embedded in said plastic element, the plastic of said element completely conforming to and firmly holding all of the exterior surfaces of the glass vial, said plastic element extending into the space between said flanges and at least one pin rigidly holding said plastic element in place in said recess.

8. A level comprising an elongated body having a recess at the top and extending down the sides thereof, said recess having concavely shaped lateral walls and a floor which bulges upwardly at the center and having spaced flanges extending into a portion of the recess from the edges of the lateral wall and floor portions and a rigid monolithic transparent plastic element completely encasing a glass spirit vial supported on said floor and affixed to said body in said recess, said glass spirit vial being embedded in said plastic element, the plastic of said element completely conforming to and firmly holding all of the exterior surfaces of the glass vial, the bottom of said plastic element which is supported on said floor being substantially flat and said plastic element extending into the space between the flanges.

References Cited in the file of this patent

UNITED STATES PATENTS

| | | |
|---|---|---|
| 624,577 | Thompson | May 9, 1899 |
| 833,598 | Hansen | Oct. 16, 1906 |
| 1,129,785 | Bracey | Feb. 23, 1915 |
| 1,210,513 | Meadows | Jan. 2, 1917 |
| 1,218,327 | Shorrock | Mar. 6, 1917 |
| 1,718,708 | Sartakoff | June 25, 1929 |
| 2,289,872 | Brinkmann | July 14, 1942 |
| 2,300,495 | Gerhart | Nov. 3, 1942 |
| 2,305,678 | Cravaritis et al. | Dec. 22, 1942 |
| 2,347,218 | Rylsky | Apr. 25, 1944 |
| 2,487,245 | Hubbard | Nov. 8, 1949 |
| 2,541,215 | Davis | Feb. 13, 1951 |
| 2,607,129 | Updyke | Aug. 19, 1952 |

FOREIGN PATENTS

| | | |
|---|---|---|
| 559,325 | Great Britain | Feb. 14, 1944 |
| 70,204 | Denmark | Nov. 14, 1949 |
| 280,539 | Switzerland | May 1, 1952 |

OTHER REFERENCES

Modern Plastics, April 1945, pages 122 and 123.

Plastic Engineering, October 1951, pages 113–116 and 121.

Popular Mechanics, November 1952, page 225.